Figure 1:
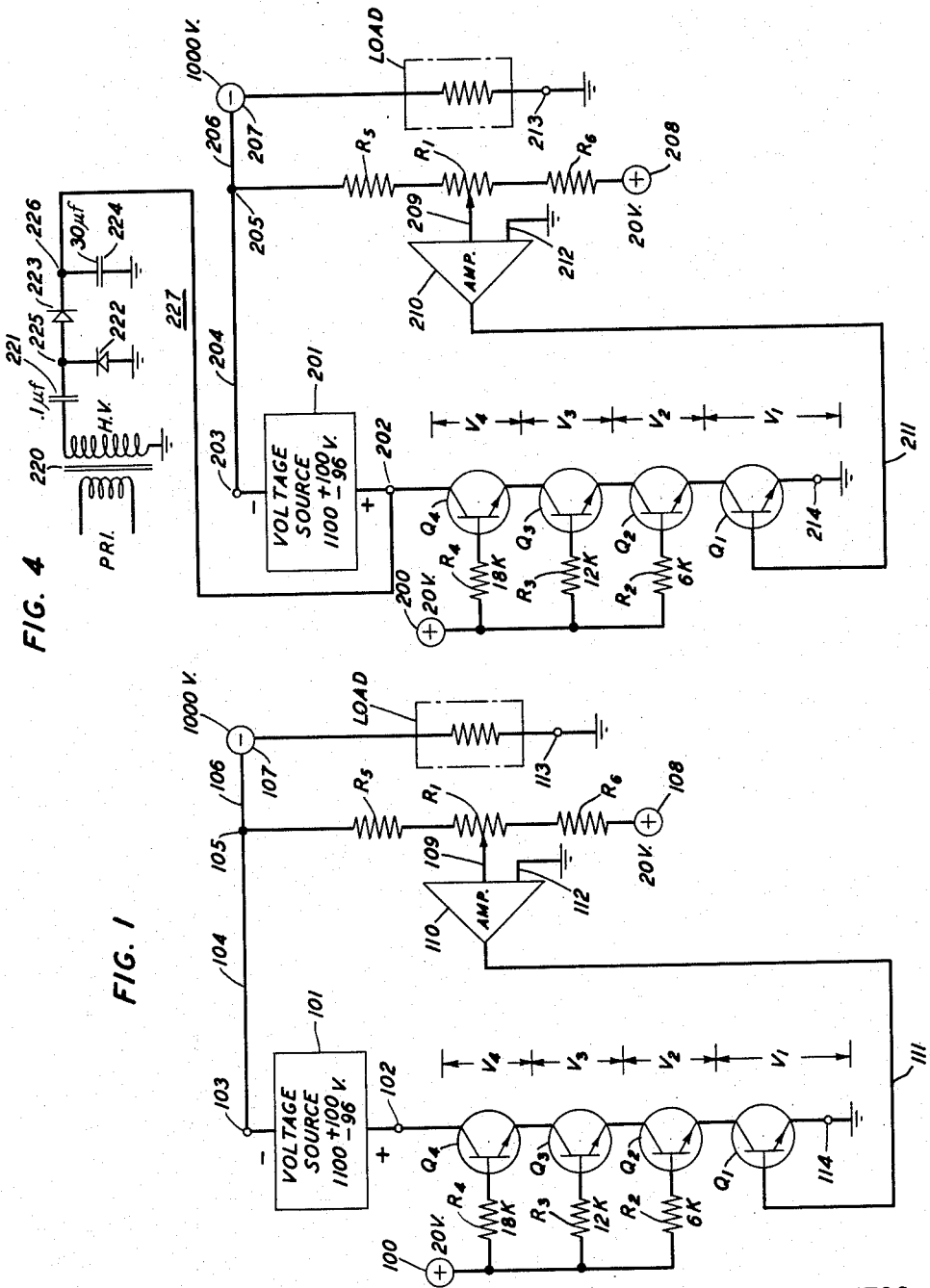

Sept. 22, 1964           C. F. AULT           3,150,310

CONTROL CIRCUIT FOR SERIES CONNECTED SEMICONDUCTORS

Filed Dec. 30, 1960           2 Sheets-Sheet 1

INVENTOR
C. F. AULT
BY *Donald M. Duft*
ATTORNEY

| V SOURCE | $V_1$ | $Ib_1$ MA | $V_2$ | $Ib_2$ MA | $V_3$ | $Ib_3$ MA | $V_4$ | $Ib_4$ MA | $I$ LOAD MA | $V$ LOAD |
|---|---|---|---|---|---|---|---|---|---|---|
| 1004 | 1 | 1 | 1 | 3 | 1 | 2 | 1 | 1 | 20 | 1000 |
| 1050 | 13 | .5 | 1 | 1.17 | 5 | .5 | 31 | .055 | 20 | 1000 |
| 1100 | 17 | .3 | 13 | .5 | 33 | -.84 | 37 | -2.4 | 20 | 1000 |
| 1150 | 30 | 0 | 35 | -1.67 | 40 | -4.6 | 45 | -5.3 | 20 | 1000 |
| 1200 | 40 | -4 | 45 | -3.34 | 50 | -5.4 | 65 | -6.4 | 20 | 1000 |

INVENTOR
C. F. AULT
BY Donald M Duft
ATTORNEY though the same transistor may safely withstand 60 or 70 volts between its collector and emitter for certain amounts of reverse base-emitter bias. The circuits provided heretofore all operate the transistors only in their forward biased condition and, as a consequence, all require a greater number of transistors than they would if they utilized both reverse and forward bias.

United States Patent Office 3,150,310
Patented Sept. 22, 1964

3,150,310
CONTROL CIRCUIT FOR SERIES CONNECTED SEMICONDUCTORS
Cyrus F. Ault, Clifton, N.J., assignor to Bell Telephone Laboratories, Incorporated, New York, N.Y., a corporation of New York
Filed Dec. 30, 1960, Ser. No. 79,876
13 Claims. (Cl. 323—22)

This invention relates to a regulator and, more particularly, to a regulator which utilizes a plurality of series-connected transistors as a variable resistance element.

Regulators of the general type disclosed herein find utility in circuits in which it is desired to maintain a constant voltage across a load when the power to the load is supplied from an unregulated voltage source. The regulator is usually connected in series between the source and the load and acts as a variable resistance element which increases its resistance as the load voltage rises and lower its resistance as the load voltage falls.

Both vacuum tubes and transistors have been used as variable resistance elements in regulator circuits. Recently however, the transistor, due to its smaller size and higher operating efficiency, has replaced the vacuum tube for this purpose in all but a few specialized applications. Although transistor regulators are a decided improvement over their vacuum tube counterparts, the use of transistors presents problems which are not encountered in the design of vacuum tube regulators. For example, the maximum voltage appearing across a vacuum tube regulator is usually not of critical importance since, due to the availability of tubes having high voltage ratings, a designer can usually be assured that a suitable tube can be found to withstand whatever potential may be applied to the regulator in any particular circuit application.

The situation is different when transistors are used. At the present state of the semiconductor art the voltage rating of most transistors is relatively low in comparison with tubes and it is difficult to obtain transistors that can tolerate potentials in excess of 200 volts. As a consequence, the circuit designer has to determine in advance the maximum voltage across a transistor regulator in each possible circuit application. A single transistor may then be used as the variable resistance element if this voltage does not exceed the capabilities of an available transistor. If it does, a plurality of transistors must be used in special and more complicated circuit configurations to insure that each transistor is operated within its capabilities. One such special circuit utilizes a plurality of series-connected transistors, rather than a single transistor, as the variable resistance element in such a manner that the voltage drop across the regulator is equally shared by each transistor.

Although series-connected transistors perform a regulating function as well as a single transistor, the use of this expedient introduces a number of concomitant problems. First of all, if the voltage drop across the regulator is sufficiently large, or, if low voltage transistors are used, the number of transistors required becomes such that their total cost renders the regulator uneconomical. Secondly, the series connection of the transistors makes it difficult to control their base currents, and hence their resistances, simultaneously because the base of each transistor in the series circuit is at a different D.-C. potential. This often precludes the use of a single base current control amplifier and necessitates a separate control means for each transistor.

From the foregoing, it may be seen that it is desirable to minimize the number of series-connected transistors required in a regulator in order that the cost of the transistors and the complexity of the overall circuit may both be minimized.

It is therefore, an object of the invention to provide a regulator wihch utilizes a minimum number of transistors.

It is a further object of the invention to provide a regulator which utilizes fewer transistors for a given voltage across the regulator than do those of the prior art.

A number of circuits have been provided heretofore which utilize series-connected transistors as a variable resistance element in regulators. All such circuits have a common disadvantage in that a relatively large number of transistors are required for a given voltage across the regulator because the transistors are operated only over a small portion of their useful range. Specifically, it is well known that the voltage which may be applied between the collector and emitter of a transistor when its base-emitter junction is either zero or forward biased is considerably less than the voltage which may be applied when the same junction is reverse biased. For example, a given transistor may have a maximum collector-to-emitter operating voltage of 25 for a zero biased base-emitter junction and a lesser operating voltage when the junction is forward biased. Yet, the same transistor may safely withstand 60 or 70 volts between its collector and emitter for certain amounts of reverse base-emitter bias. The circuits provided heretofore all operate the transistors only in their forward biased condition and, as a consequence, all require a greater number of transistors than they would if they utilized both reverse and forward bias.

The present invention minimizes the number of transistors required for a given regulator voltage by operating the transistors with a forward emitter-base bias when a low regulator resistance is desired and with a reverse bias when a high regulator resistance is desired. This mode of operation increases the effective resistance range that may be provided by each transistor, increases the voltage that may be applied to each transistor and, as a consequence, reduces the number of transistors required in comparison with the heretofore available regulators.

In accordance with the present invention, an arrangement is disclosed wherein the resistance of an entire string of series-connected transistors is effectively and smoothly controlled by a single amplifier connected to the base of one of the transistors. The bases of the other transistors are connected to a passive circuit in such a manner that the base current of every transistor in the string varies as the base current of the amplifier controlled transistor is varied.

Further in accordance with the present invention, a regulator is connected in series between ground and one output terminal of a D.-C. source while the load is connected between ground and the source output terminal of opposite polarity. A potentiometer is connected between the ungrounded side of the load and a source of reference potential of opposite polarity. The variable tap on the potentiometer is initially adjusted for zero potential as the load voltage is at the desired value. A control amplifier is provided having an input connected to the potentiometer tap and an output connected to the base of the one transistor in the series string whose emitter is connected to ground. The base of each other transistor in the string is connected through a resistance network to the source of reference potential. When the potentiometer tap is at zero potential, the gain of the control amplifier is adjusted whereby the amplifier supplies the necessary base current to the lower transistor to regulate its resistance, as well as that of the rest of the transistors in the chain, to the value necessary to maintain the load voltage at the proper value. Any subsequent load potential variations result in a variation of the tap potential which is detected and amplified to alter the base current and resistance of the transistor network to restore the load voltage to the proper value.

The resistance of the network and the magnitude of the reference potential are adjusted so that the base current and hence the resistance of each transistor in the series string changes in response to a change in the base current of the amplifier controlled transistor.

The range of the control amplifier is sufficient whereby it can heavily forward bias the base-emitter junction of the lower transistor to saturation so that the resistance of the transistor, and hence the voltage across it, is low for low output conditions of the source and, conversely, so that it can heavily reverse bias the base-emitter junction whereby the resistance of the transistor, and hence the voltage across it, is high during high output conditions of the source.

A feature of the present invention is the provision of a regulator circuit utilizing a plurality of series-connected transistors as a variable resistance element in which the base current of each transistor may be varied from a relatively large forward to a relatively large negative value.

A further feature of the invention is the provision of a regulator circuit comprising a plurality of series-connected transistors wherein the resistance of the series circuit is controlled by an amplifier which supplies the base current of one transistor while the base of each remaining transistor is connected to a passive circuit which causes the base current of each remaining transistor to vary in response to variations in the base current of the amplifier-connected transistor.

A further feature of the invention is the provision of a regulator comprising series-connected transistors in which the base current of one transistor is controlled by an active means while the base current of the remaining transistors is controlled from a source of fixed reference potential.

A further feature of the invention is the provision of a regulator for maintaining a constant load voltage in which a plurality of series-connected transistors are utilized as a variable resistance means together with an amplifier which, in response to variations in the load voltage, causes the base currents of said transistors to vary from a forward to a reverse amount.

A feature of the present invention is the provision of a regulator circuit utilizing a plurality of series-connected transistors as a variable resistance element for maintaining a constant load potential wherein the base current of each transistor may vary from a relatively large forward to a relatively large negative value.

A feature of the present invention is the provision of a regulator circuit utilizing a plurality of series-connected transistors in which the base current of each may vary from a relatively large forward to a relatively large reverse value as the voltage of the unregulated source rises from a relatively low to a relatively large potential.

A further feature of the invention is the provision of a regulator circuit for maintaining a constant load voltage and comprising a plurality of series-connected transistors wherein the resistance of the series circuit is controlled by an amplifier which detects load voltage variations and, in response thereto, varies the base current of one transistor while the base of each remaining transistor is connected to a passive circuit which causes the base current of each remaining transistor to vary in response to a similar variation in the base current of the amplifier-connected transistor.

A further feature of the invention is the provision of a regulator which utilizes a plurality of series-connected transistors for maintaining a constant voltage across a load together with an amplifier for detecting variations in the load voltage and, in turn, regulating the base current and resistance of one of the series transistors while the base of each remaining transistor is connected to a source of fixed reference potential which causes the base current of each remaining transistor to vary from a relatively large forward to a relatively large reverse value as the potential of the unregulated source rises from its lower to its upper extreme.

A further feature of the invention is the provision of a regulator comprising a plurality of series-connected transistors for maintaining a constant load voltage wherein deviations in the load voltage are amplified and applied to the base of one of said transistors to vary its base current from a relatively large forward to a relatively large reverse value as the potential of the unregulated source rises from its lower to its upper extreme together with a passive circuit interconnecting the base of each remaining transistor with the source of reference potential whereby the base current of each remaining transistor varies from a forward to a reverse value in response to variations in the base current of the amplifier-connected transistor.

A further feature of the invention is the provision of a regulator comprising a plurality of series-connected transistors for maintaining a constant load voltage in which the resistance of the transistors is varied from a relatively low to a relatively large amount by causing the base currents of said transistors to vary from a relatively large forward to a relatively large reverse value together with an auxiliary current generator for maintaining the regulation of the load voltage for zero current conditions of the load.

Figures 2, 3:
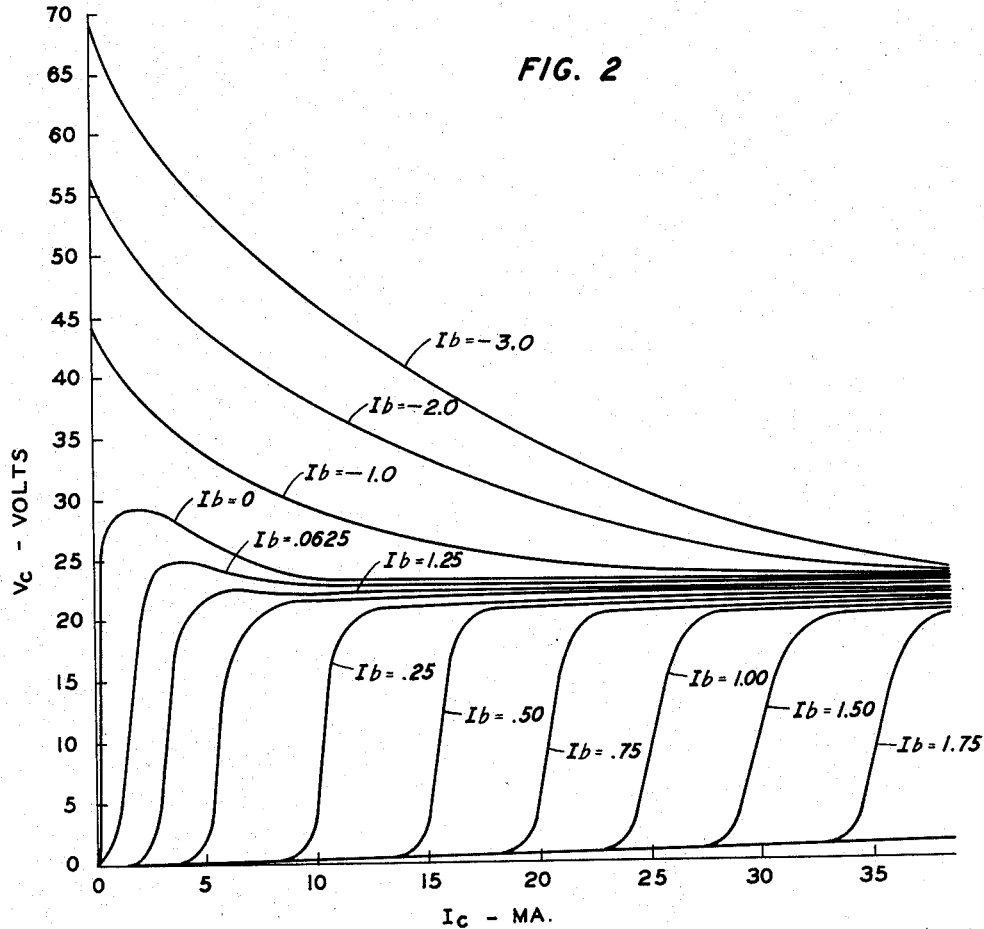

These and other objects and features of the invention will become apparent upon a reading of the following description of the invention taken in conjunction with the drawings in which:

FIG. 1 discloses an exemplary embodiment of the invention;

FIG. 2 discloses a set of transistor characteristic curves relative to the invention;

FIG. 3 discloses in chart form the voltages across certain circuit elements of FIG. 1 during various assumed conditions; and FIG. 4 discloses another exemplary embodiment of the invention.

Referring to FIG. 1, there is provided an unregulated direct-current voltage source 101 having its negative output connected to terminal 103 and its positive output connected to terminal 102. Terminal 103 is connected over conductors 104 and 106 to an output terminal 107 from which a load is connected to ground at terminal 113. Terminal 102 is connected to ground at terminal 114 by a circuit comprising transistors Q1–Q4 which are connected in series collector-to-emitter-wise. A series circuit comprising resistors R5, R1, and R6 is connected at its one end to the negative output of source 101 at terminal 105 and at its other end to a source 108 which is maintained at a potential of +20 volts.

From the foregoing it may be seen that the output of unregulated source 101 is effectively connected in series with both the load and transistors Q1–Q4. Thus, the output of source is applied to both the load and the transistors with the division of potential on each being determined by the effective resistance of the transistors and the load.

The input of amplifier 110 is connected to a variable tap 109 on resistor R1 while its output is connected over conductor 111 to the base of transistor Q1. The tap is initially adjusted so that it is at zero or ground potential when the voltage across the load is at the desired value. This being the case, an increase in load potential alters the potential of tap 109 so that it becomes negative with respect to ground. This negative potential is applied to amplifier 110 where it is amplified and applied over conductor 111 is the proper polarity to decrease the base current of transistor Q1. As is hereinafter described, a decrease in the base current of transistor Q1 increases the resistance of the entire transistor chain so that the load voltage is reduced and returned to its proper value. Conversely, if the potential across the load should fall, the potential of tap 109 becomes positive with respect to ground. This change in the potential of tap 109 is, in a similar manner, amplified and applied to the base of transistor Q1 to lower the resistance of the transistor string and thereby restore the load potential to the nominal value.

In order to facilitate an understanding of the invention, let it be assumed that it is desired to maintain −1000 volts across the load while the voltage of the unregulated source, which has a nominal potential of −1100 volts, may deviate between −1004 and −1200 volts. As long as the potential of the source 101 is maintained at its nominal value of −1100 volts it is obvious that the transistor network should have exactly 100 volts impressed across it in order that the load voltage may be held at −1000 volts. Also, if the voltage of the source should rise to 1200 volts, the resistance of the transistor string should rise sufficiently so that the 200 volts will be impressed across it. On the other hand, it is also apparent that if the potential of the source should decrease to 1004 volts, that the resistance of the transistors should be made as low as possible in order that all but four volts from the source may be applied to the load.

FIG. 3 discloses in chart form the voltages across different elements of the circuit of FIG. 1 for various assumed output potentials from the source 101. In each case it is assumed that the load current and voltage remain constant at 20 milliamperes and −1000 volts, respectively. The top row discloses the resulting potentials when the output of the source decreases to 1004 volts. Under this condition, the potential of the tap 109 changes from its normal value of zero volts to some positive potential. This positive potential is amplified and applied over conductor 111 to the base of transistor Q1 to forward bias it so that resistance of transistor Q1 as well as the other transistors will be as low as possible. Let it be assumed as shown in FIG. 3 that the voltage drop across a transistor in a saturated condition is 1 volt and thus the collector to emitter voltage of transistor Q1, which is shown as voltage V1, is 1 volt. In this case, both the collector of transistor Q1 and the emitter of transistor Q2 are at a positive 1 volt potential. The base of transistor Q2 is connected through a 6000 ohm resistor R2 to a source 100 which is maintained at a fixed potential of +20 volts. Thus, the base current of transistor Q2 is approximately 3 mils which is sufficient to cause it to go into its saturated condition whereby its collector to emitter voltage drop is also 1 volt.

The potential of the emitter of transistor Q3 is +2 volts with respect to ground since it is connected to the collector of transistor Q2. The base of transistor Q3 is connected through a 12,000 ohm resistor R3 to a source of +20 volts so that its base current is approximately 2 milliamperes. This is sufficient to saturate Q3 whereby its collector-to-emitter voltage drop is also 1 volt. Continuing, the emitter to transistor Q4 is 3 volts positive with respect to ground. The base of transistor Q4 is connected in series with an 18,000 ohm resistor R4 to the +20 volt source so that its base current is approximately 1 milliampere. This base current is sufficient to saturate transistor Q4 so that it also has a 1 volt drop between its collector and its emitter.

In summary, it may be seen that each transistor is currently in a saturated condition in which its resistance is at a minimum and in which the voltage drop from its collector to its emitter is 1 volt. Since it is assumed that the output of the source is currently 1004 volts, it is apparent that the load voltage is maintained at the desired value of 1000 under this condition and that 4 volts is applied across the regulator.

Next, let it be assumed that the potential of source 101 increases in a negative direction sufficiently so that the potential applied to terminals 102 and 103 is 1050 volts. This increase in negative potential is detected by the input of the amplifier 110 at its tap 109 as its potential rises negatively. This, in turn, reduces the base current of transistor Q1 sufficiently whereby the string of transistors Q1–Q4 raises its resistance to dissipate 50 volts across it and maintain 1000 volts across the load. The voltages across the various circuit elements during this condition are shown on the second row of FIG. 3. For example, the base current of transistor Q1 is reduced to .5 milliampere which raises its collector-to-emitter resistance and increases the drop between these two elements to 13 volts. The emitter of transistor Q2 is now 13 volts positive with respect to ground since it is connected to the collector of transistor Q1. This being the case, the base current of transistor Q2 is $$\frac{20-13 \text{ volts}}{6K \text{ ohms}}$$

or approximately 1.17 milliamperes. This current is sufficient to maintain transistor Q2 saturated whereby its collector-to-emitter voltage V2 remains at 1 volt.

The emitter of transistor Q3 at this time is 14 volts positive and therefore its base current is approximately .5 milliampere. This base current raises the resistance of the transistor so that its collecter-to-emitter voltage V3 rises to 5 volts.

The emitter of transistor Q4 is now 19 volts positive with respect to ground and hence its base current is approximately .055 milliampere. This base current raises its resistance so that its collector-to-emitter voltage drop becomes 31 volts.

It may be seen by adding up the voltage drops across each of transistors Q1–Q4 that the total voltage across the chain during this condition is 50 volts. Since the output of the source at this time is assumed to be 1050, the 50 volt drop across the transistor chain permits the desired potential of 1000 volts to be maintained across the load.

Next, let it be assumed that the potential of the source rises to its nominal value of 1100. This increase in potential restores the potential of tap 109 to its original ground or zero voltage whereupon the amplifier 110 reduces the base current of transistor Q1 sufficiently so that the string of transistors Q1–Q4 increases its resistance and thereby dissipates an increased voltage to maintain the desired load potential. Referring to the third row of FIG. 3, it may be seen that the voltage V1, which is a drop across transistor Q1, is 17 at this time while the base current of the transistor is .3 milliampere. The emitter of transistor Q2 thereby becomes 17 volts positive with respect to ground. The potential difference between the 20 volt potential of the source 100 and the potential of emitter of transistor Q2 is sufficient to maintain a base current of .5 milliampere in transistor Q2 which, in turn, alters its resistance so that its collector-to-emitter voltage V2 becomes now 13 volts.

The emitter of transistor Q3 is now 30 volts positive with respect to ground. This potential back biases the emitter-base junction of the transistor since its base is connected to a 20 volt source through the 12,000 ohm resistor. A reverse base current of approximately .84 milliamperes flows at this time and raises the resistance of transistor Q3 so that its collector-to-emitter drop becomes 33 volts. The emitter-base junction of transistor Q4 is also back biased at this time since its emitter is 63 volts positive while its base is connected through the 18,000 ohm resistor to the 20 volt source. This potential difference develops a reverse base current of approximately 2.4 milliamperes which, in turn, raises the resistance of transistor Q4 so that approximately 37 volts is impressed across it.

It may be seen by totaling the collector-to-emitter drop of each transistor at this time that 100 volts is currently being dissipated across the transistor string. This permits the load voltage to be maintained at the desired level of 1000 volts when the output of the source remains at 1100 volts.

The base current flowing in transistors Q3 and Q4 at this time is said to be of the reverse type since it is opposite in direction from the base current flowing when the base-emitter junction of these transistors is forward biased. Referring to FIG. 1 and utilizing the terminology associated with conventional current flow, the base current of a transistor may be said to flow into the base, through the base-emitter junction and out the emitter whenever the base-emitter junction is forward biased. This type of current is referred to as forward base current in the present specification. The foregoing description has explained how the forward base current decreases in magnitude as the potential of the emitter of a transistor increases in a positive direction. It has also been explained how the base current reverses in direction when the potential on the emitter of a transistor rises above that of its base. At this time, the base current does not traverse the base-emitter circuit as does the forward base current, but instead, traverses the collector-base path. The collector circuit supplies the base current at this time since current flows from the positive output terminal 102 of the unregulated source, through the collector-base-emitter path of each transistor to ground on terminal 114. Thus, assuming a continuance of conventional current flow whereby current flows from positive to negative, the base current during the reversed biased condition of the emitter-base junction is supplied by the collector and consequently, the reverse base current may be said to flow into the collector of the transistor, across the collector-base junction and then out of the base, through its associated resistor, to the 20-volt potential on terminal 100.

Continuing, row 4 of the chart on FIG. 3 discloses the voltage across each transistor, together with the base current of each, as the output of source 101 increases still further negatively to 1150 volts.

The bottom line on the chart illustrates the condition of the circuit as the output of the source rises to its maximum of 1200 volts. This condition is detected by tap 109 which causes the amplifier 110 to apply a reverse base current of 4 milliamperes to transistor Q1. This base current raises the resistance of transistor Q1 so that its collector-to-emitter potential rises to 40 volts. The emitter of transistor Q2 is at 40 volts at this time and it thereby develops a reverse base current of 3.34 milliamperes. This base current in turn raises the resistance of transistor Q2 so that its collector-to-emitter voltage drop becomes 45 volts. Continuing, the emitter of transistor Q3 is at 85 volts with respect to ground which develops a reverse base current in the transistor of 5.4 milliamperes. This in turn raises the collector-to-emitter drop of the transistor to 50 volts. The emitter of transistor Q4 is currently at 135 volts with respect to ground. The transistor is back biased under this condition so that a reverse base current of about 6.4 milliamperes flows and develops a collector-to-emitter voltage drop of 65 volts.

Adding the drops across each transistor in the string at this time, it is seen that 200 volts is dissipated across the transistors in order to enable the load voltage to be maintained at the desired level of 1000 volts.

From the foregoing description it may be seen that the transistors Q1–Q4 act as a variable resistance to keep the potential across the load constant as the output of source 101 varies. The resistance of the transistors is controlled by the amplifier 110 whose input detects any deviations in load voltage and whose output alters the resistance of the transistor string to counteract the detected change and restore the load voltage to the desired value. It has been shown that the resistance of the transistor string may vary from extremely low values, for a low output potential from source 101, to extremely high values, for an abnormally high output potential from the source. Thus, the voltage drop across the transistor string accordingly varies from approximately 4 volts for its low resistance condition to approximately 200 volts for its high resistance condition.

It should be noted that the foregoing variations in the resistance of the transistor string require only a single amplifier, such as amplifier 110, to regulate the base current of the lower transistor, transistor Q1. The new and novel circuit disclosed herein controls the base currents of the remaining transistors in the string, transistors Q2–Q4, in such a manner that the resistance of every transistor is varied as a consequence of the varying base currents applied to transistor Q1 by amplifier 110.

It should be further observed that the circuit varies the resistance of the transistors from an extremely low value to an extremely high value by varying the base current of each from a relatively large forward quantity to a relatively large reverse quantity. Most circuits in which transistors are used as regulators operate the transistors only with forward base currents. The effective resistance presented by the collector-emitter path of a transistor is significantly larger when a reverse base current is applied than it is with a forward base current. Therefore, the present circuit, which permits the transistors to be operated with both reverse and positive base currents, is advantageous in that a single transistor, or a given number of transistors, may provide a greater range of resistance than would be the case if reverse base currents were not utilized.

The significance of the foregoing may be appreciated from an inspection of FIG. 2 which discloses a set of characteristic curves for a transistor of the type which might be utilized in the present invention. Let it be assumed that the maximum permissible collector current for a particular transistor is 35 milliamperes and that any current in excess of this will result in irreparable damage. Referring to FIG. 2, it may be seen that the transistor cannot be operated with a base current of 1.75 milliamperes unless the collector voltage is held to very low values since approximately 5 volts on the collector together with a base current of this amount will produce collector currents in excess of the permitted maximum. From an inspection of the curves representing the lesser values of forward base currents it may be seen that forward base currents lose control of the collector current and that the collector current abruptly changes from an allowable to a destructive value as the collector voltage approaches 25. Specifically, from an inspection of the curve representing a base current of .5 milliampere it is seen that the collector current switches from 15 milliamperes to a destructive value as the collector voltage is increased from 20 to 25 volts. Thus, it is obvious that for forward base currents, or even for a base current of zero, it is necessary to operate the transistor significantly below the 25 volt level if the collector current is to be prevented from exceeding its maximum permissible value. However, by inspecting the curves representing reverse base currents, specifically −1, −2, and −3 milliamperes it is seen that the operating voltage of the transistor may be extended to be approximately 70 volts provided the necessary reverse base current is applied at the same time to limit the collector current.

It has been pointed out that transistor regulators utilized heretofore have limited the operation of the transistors to the forward base current condition. Conversely, it has been shown that the present circuits operate the transistors in both their forward and reverse base current conditions. It may now be better appreciated from a study of FIG. 2 how the operation of the transistors under these conditions permits a given transistor, or a given number of transistors, to offer a wider range of resistance as well as how a given number of transistors can dissipate a far greater voltage.

FIG. 4 discloses a circuit which is similar to that of FIG. 1 but yet which permits regulation of the load voltage to be maintained down to and including the zero current condition of the load.

The forward base currents in FIG. 1 for transistors Q2–Q4 are provided by the current through resistors R2, R3 and R4 resulting from the potential differences between the positive 20 volts of source 200 and ground at terminal 114 which is the emitter of transistor Q1. The preceding description has described how the base-emitter junctions of all transistors are forward biased only for relatively low outputs of source 101 and how that at all other times one or more of the transistors have their base-emitter junctions reverse biased. Specifically, from the bottom line on the chart on FIG. 3 it may be seen that the base-emitter junction of each transistor is heavily reverse biased when the potential of source 101 is at its upper extreme.

The currents required to reverse bias the transistors are supplied by the potential difference between the positive 20 volt source 100 and the collector of each transistor. The current resulting from these potential differences is supplied by the load which is grounded at terminal 113. Thus, the complete circuit for the reverse base currents may be said to include the grounded terminal (not shown) of the 20 volt source, the 20 volt source, resistors R2, R3 and R4 and transistors Q2, Q3 and Q4, as required, the source 101, conductors 104 and 106, the load, and back to ground at terminal 113. The bottom row on FIG. 3 shows that approximately 20 mils of current (the sum of currents IB1–IB4) is required to reverse bias the transistors during high output conditions of source 101. The circuit of FIG. 1 can maintain this load regulation for all load currents down to and including 20 mils. However, for load currents less than this the emitter base junctions of the transistors are not reverse biased in the required amount and, as a consequence, their resistance falls and thereby permits the load voltage to rise above the regulated value.

In many instances, it is desired to maintain a regulated load voltage for extremely low values of load current down to and including zero. The circuit of FIG. 1 cannot accomplish this since there is no means to provide the reverse base currents to the transistors at this time. One obvious solution would be to decrease the impedance of the reference chain comprising resistors R1, R5 and R6 so that sufficient current flowed through it at all times to supply the reverse base currents required during high voltage conditions of source 101. Although this expedient would accomplish the desired result, it is otherwise objectionable since it would result in a continuous dissipation of power in the reference string at all times rather than only during zero load current conditions.

The desired regulation of the load voltage for small load currents down to and including zero is provided by the circuit of FIG. 4 which is identical to that of FIG. 1 with the exception that the auxiliary power supply comprising elements 220–226 is connected over conductor 227 to terminal 202 in FIG. 4 which corresponds to terminal 102 in FIG. 1. Transformer 220, condenser 221, diodes 222 and 223 and condenser 224 comprise for the most part a conventional rectifier of the voltage doubler type in which condenser 224 is normally charged to twice the peak potential of the high voltage secondary. However, the value of condenser 221 is sufficiently low so that its reactance at the operating frequency of the source supplying the primary of transformer 220 is high. This, in turn, causes the current through the transformer to be reactive. Since the transformer is required to supply only reactive current, it dissipates only a minimum of power and thus is an economical means of providing the desired reverse base currents during zero conditions of the load. The potential of the high voltage secondary and the reactance of condenser 221 is chosen so that sufficient current will flow over conductor 227 during high voltage conditions of source 201 and low current conditions of the load to supply the current required to reverse bias base emitter junctions of each of transistors Q1–Q4.

It is to be understood that the above-described arrangements are but illustrative of the application of the principles of the invention. For example, the specific voltages and resistance values indicated on the drawings and referred to in the specification are not to be considered as a limiting factor and were utilized only to facilitate an understanding of the invention. Numerous other arrangements may be devised by those skilled in the art without departing from the spirit and scope of the invention.

What is claimed is:

1. A regulator comprising, a plurality of transistors connected serially collector to emitter-wise between two terminals, means connected to the base of one of said transistors for controlling its collector-to-emitter resistance by varying its base current, and means common to all remaining transistors for varying the base current of each from a forward to a reverse value in response to a variation in the base current of said one transistor, said last-named means being effective to control the collector-to-emitter resistance of said remaining transistors.

2. A regulator comprising, a plurality of transistors connected serially collector to emitter-wise between two terminals, means connected to the base of one of said transistors for controlling its collector-to-emitter resistance by varying its base current, a source of reference potential, and a resistor individual to each remaining transistor and interconnecting its base with said source for controlling the collector-to-emitter resistance of each of said remaining transistors by varying its base current from a forward value to a reverse value in response to a variation in the base current of said one transistor.

3. A variable resistance element comprising a first and a second terminal, a first transistor having its emitter connected to said second terminal, a plurality of additional transistors connected serially collector-to-emitter-wise between said first terminal and the collector of said first transistor, means connected to the base of said first transistor for controlling its collector-to-emitter resistance by varying its base current, and means common to said additional transistors for varying the base current of each from a forward value to a reverse value in response to a variation in the base current of said first transistor, said last-named means being effective to vary the collector-to-emitter resistance of said additional transistors.

4. In a regulator interconnecting a varying voltage source and a load, a plurality of transistors connected serially collector to emitter-wise between said load and said source, means connected to the base of one of said transistors for maintaining the load voltage constant as the potential of said unregulated source varies, and means common to all remaining transistors for varying the base current of each from a forward value to a reverse value as the potential of the unregulated source rises from its lower to its upper extreme.

5. In a regulator interconnecting a varying voltage source and a load, a plurality of transistors connected serially collector to emitter-wise between said load and said source, means connected to the base of one of said transistors for maintaining the load voltage constant as the potential of said unregulated source varies, a source of reference potential, and a resistor individual to each remaining transistor and interconnecting its base with said source for varying the base current of each from a forward value to a reverse value as the potential of the unregulated source rises from its lower to its upper extreme.

6. In a regulator interconnecting a varying voltage source and a load, a plurality of transistors connected serially collector-to-emitter-wise between said source and said load, means connected to the base of the transistor whose emitter comprises one end of said serial connection for maintaining the load voltage constant as the potential of said unregulated source varies, and means common to all remaining transistors for varying the base current of each from a forward value to a reverse value as the potential of the unregulated source rises from its lower to its upper extreme.

7. In combination, a pair of input terminals upon which is impressed an unregulated source of potential, a pair of output terminals, a load connected across said output terminal, a conductor interconnecting one of said input terminals with one of said output terminals, a variable resistance connected between the other of said input and output terminals and comprising, a plurality of transistors connected serially collector to emitter-wise between said other terminals, means connected to the base of one of said transistors for varying its base current as the potential of said unregulated source varies, and means common to all remaining transistors for varying the base current of each from a forward value to a reverse value in response to a variation in the base current of said one transistor.

8. In combination, a pair of input terminals upon which is impressed an unregulated source of potential, a pair of output terminals, a load connected across said output terminals, a conductor interconnecting one of said input terminals with one of said output terminals, a variable resistance regulating element connected between the other of said input and output terminals and comprising, a plurality of transistors connected serially collector to emitter-wise between said other terminals, means for continuously detecting the voltage across said load, means connected to the base of one of said transistors and controlled by said detecting means for varying its base current as the potential of said unregulated source varies, and means common to all of said remaining transistors for varying the base current of each from a forward value to a reverse value in response to a variation in the base current of said one transistor.

9. In combination, a pair of input terminals upon which is impressed an unregulated source of potential, a pair of output terminals, a load connected across said output terminals, a conductor interconnecting one of said input terminals with one of said output terminals, a variable resistance regulating element connected between the other of said input and output terminals and comprising, a plurality of transistors connected serially collector to emitter-wise between said other terminals, means connected to the base of one of said transistors for varying its base current as the potential of said unregulated source varies, a resistor individual to and connected to the base of each remaining transistor, and a fixed source of potential connected through said resistors to the base of said remaining transistors for varying the base current of each from a forward value to a reverse value as the potential of the unregulated source rises from its lower to its upper extreme.

10. In combination, a pair of input terminals upon which is impressed an unregulated source of potential, a pair of output terminals, a load connected across said output terminals, a conductor interconnecting one of said input terminals with one of said output terminals, a variable resistance regulating element connected between the other of said input and output terminals and comprising a plurality of transistors connected serially collector to emitter-wise between said other terminals, output voltage error sensing means connected to the base of the transistor whose emitter is connected to one of said other terminals for varying its base current as the potential of said unregulated source varies, a resistor individual to and connected to the base of each remaining transistor, and a fixed source of potential connected through said resistors to the base of said remaining transistors for varying the base current of each from a forward value to a reverse value as the potential of the unregulated source rises from its lower to its upper extreme.

11. In a regulator interconnecting a varying voltage source and a load, a plurality of transistors connected serially collector to emitter-wise between said source and said load, means connected to the base of an end transistor in said serial connection for maintaining the load voltage constant as the potential of said unregulated source varies, means common to all remaining transistors for varying the base current of each from a forward value to a reverse value as the potential of the unregulated source rises from its lower to its upper extreme, and means for supplying a reverse base current to said transistors during zero current conditions of said load to maintain said constant load voltage.

12. In a regulator interconnecting a varying voltage source and a load, a plurality of transistors connected serially collector to emitter-wise between said source and said load, means connected to the base of an end transistor in said serial connection for maintaining the load voltage constant as the potential of said unregulated source varies, a fixed source of potential interconnected with the base of each remaining transistor for varying the base current of each from a forward value to a reverse value as the potential of the unregulated source rises from its lower to its upper extreme, and means for supplying said reverse current during zero current conditions of said load.

13. In combination, a pair of input terminals upon which is impressed an unregulated source of potential, a pair of output terminals, a load connected across said output terminals, a conductor interconnecting one of said input terminals with one of said output terminals, a variable resistance regulating element connected between the other of said input and output terminals and comprising, a plurality of transistors connected serially collector to emitter-wise between said other terminals, means connected to the base of one transistor for varying its base current as the potential of said unregulated source varies, a resistor individual to and connected to the base of each remaining transistor, and a fixed source of potential connected through said resistors to the base of said remaining transistors for varying the base current of each from a forward value to a reverse value as the potential of the unregulated source rises from its lower to its upper extreme, and means shunting said plurality of series-connected transistors for supplying said reverse base current thereto during zero current conditions of said load.

References Cited in the file of this patent

UNITED STATES PATENTS

| | | |
|---|---|---|
| 2,915,693 | Harrison | Dec. 1, 1959 |
| 2,922,945 | Norris et al. | Jan. 26, 1960 |